(12) United States Patent
Schreiber

(10) Patent No.: US 7,463,354 B2
(45) Date of Patent: Dec. 9, 2008

(54) DEVICE FOR THE SPECTRAL SELECTION AND DETECTION OF THE SPECTRAL REGIONS OF A LIGHT BEAM

(75) Inventor: Frank Schreiber, Heidelberg (DE)

(73) Assignee: Leica Microsytems CMS GmbH, Wetzlar (DE)

( * ) Notice: Subject to any disclaimer, the term of this patent is extended or adjusted under 35 U.S.C. 154(b) by 93 days.

(21) Appl. No.: 10/553,717

(22) PCT Filed: Feb. 12, 2004

(86) PCT No.: PCT/DE2004/000255

§ 371 (c)(1),
(2), (4) Date: Oct. 17, 2005

(87) PCT Pub. No.: WO2004/097491

PCT Pub. Date: Nov. 11, 2004

(65) Prior Publication Data

US 2006/0203241 A1 Sep. 14, 2006

(30) Foreign Application Priority Data

Apr. 30, 2003 (DE) ................................ 103 19 776

(51) Int. Cl.
*G01J 3/28* (2006.01)

(52) U.S. Cl. ...................................... 356/326

(58) Field of Classification Search .................. 356/326, 356/327, 317, 319, 325, 417; 250/212, 574
See application file for complete search history.

(56) References Cited

U.S. PATENT DOCUMENTS 4,070,112 A * 1/1978 Tsunazawa et al. ......... 356/319
5,886,784 A * 3/1999 Engelhardt .................. 356/326
6,369,928 B1 4/2002 Mandella et al.

(Continued)

FOREIGN PATENT DOCUMENTS

DE 43 30 347 3/1995

(Continued)

OTHER PUBLICATIONS

International Search Report for PCT/DE2004/000255 (3 pages).

(Continued)

*Primary Examiner*—Gregory J Toatley, Jr.
*Assistant Examiner*—Abdullahi Nur
(74) *Attorney, Agent, or Firm*—Darby & Darby

(57) ABSTRACT

An apparatus for the spectral selection and detection of spectral regions of a light beam includes a selection unit and a detection unit. The selection unit includes a spectral splitting device and a light blocking and reflecting device. The spectral splitting device is for spectrally splitting the light beam. The light blocking and reflecting device is for blocking a first spectral region and reflecting at least part of an unblocked second spectral region. The detection unit includes a number of detectors. At least one of the detectors is disposed in a first beam path of the blocked second spectral region. At least one of the detectors is disposed in a second beam path of the reflected first spectral region. Each of the detectors has a different detection property or uses a respective different detection method.

26 Claims, 2 Drawing Sheets

U.S. PATENT DOCUMENTS

| | | | |
|---|---|---|---|
| 6,459,484 B1 | 10/2002 | Yokoi | 356/318 |
| 6,961,124 B2 | 11/2005 | Engelhardt et al. | |
| 2002/0176162 A1 | 11/2002 | Borlinghaus | 359/432 |
| 2004/0042007 A1* | 3/2004 | Osipchuk et al. | 356/318 |

FOREIGN PATENT DOCUMENTS

| | | |
|---|---|---|
| DE | 199 02 625 | 9/1999 |
| EP | 1255105 | 11/2002 |
| WO | WO 95/07447 | 3/1995 |

OTHER PUBLICATIONS

Wolfgang Becker et al.: "Lifetime Imaging Techniques for Optical Microscopy", Online!, Feb. 2003, XP-002290246, http://www.becker-hickl.de/pdf/tcvgbh1.pdf, retrieved from the Internet on Jul. 26, 2004, pp. 1-41.

Holger Birk et al.: "Programmable beam-splitter for confocal laser scanning microscopy", International Society for Optical Engineering, U.S.A., Proceedings of SPIE, vol. 4621, May 2002, XP-002290245, pp. 16-27.

* cited by examiner

DEVICE FOR THE SPECTRAL SELECTION AND DETECTION OF THE SPECTRAL REGIONS OF A LIGHT BEAM

The present invention relates to a device for the spectral selection and detection of the spectral regions of a light beam, said selection unit comprising means for spectrally splitting the light beam and means for blocking a spectral region and reflecting at least part of the unblocked spectral region, said detection unit comprising detectors which are arranged in the beam path of the blocked spectral region and in the beam path of the reflected spectral region.

A device for the spectral selection and detection of the spectral regions of a light beam is known from German patent application DE 43 30 347 A1. This device endeavored to carry out the selection and the detection of the different spectral regions simultaneously and at high yields. In reference to claim 5 of that specification, several spectral regions are associated in a cascade with blocking and reflecting means as well as detectors, so that each blocking spectral region is detected and each reflected spectral region is once again blocked, if applicable, and likewise detected.

The known device—also referred to as a multi-band detector in technical circles—has the drawback that it is only suited for very specific applications since it combines exclusively detectors that have the same design. Consequently, depending on the concrete application, a module with a very specific type of detector has to be selected in order to achieve a detection capacity that is tailored to and thus suitable for the application case in question. Accordingly, different detection modules of the generic type have been built so far that then—depending on the requirements—are implemented at suitable places in or on the instrument, normally in or on a scanning microscope.

It is thus an object of the present invention to provide a device for the spectral selection and detection of the spectral regions of a light beam that can be used universally, regardless of the concretely required detection method. A simple design, along with a reliable selection and detection of different spectral regions, is desireable.

The present invention provides a device for the spectral selection and detection of the spectral regions of a light beam, said selection unit comprising means for spectrally splitting the light beam, and means for blocking a spectral region and reflecting at least part of the unblocked spectral region, said detection unit comprising detectors which are arranged in the beam path of the blocked spectral region and in the beam path of the reflected spectral region. According to the present invention, detectors that have different designs and different detection properties or detection methods are provided so that it is possible to activate—via the specifically reflected or blocked beam path—precisely those detectors whose detection possibilities are needed for the concrete application. In other words, detectors that have different designs are provided in the individual selection branches and said detectors can be actuated with or exposed to the spectral region needed in each case.

Advantageously, several means for blocking and reflecting spectral regions as well as detectors are arranged in a cascade so that the blocked or reflected spectral region is detected and the blocked or reflected spectral region is once again blocked or reflected and then detected. In the various cascades, detectors that have different designs are provided so that, by actuating the individual detectors, a different detection requirement is met. In any case, it is essential that detectors that have different designs are combined in the device according to the invention, and these can be detectors of any suitable kind.

Detectors that have the same design can also be provided in the various cascades, said detectors then being used to detect different spectral regions. For example, groups of identical detectors can be combined in a cascade, whereby the detectors differ from one cascade to the next. A "mix" of different detectors in the same cascade can likewise be implemented.

At least two spectral regions can be selected and detected per cascade. In an advantageous manner, by appropriately arranging means for spectrally splitting the light beam and means for blocking spectral regions, at least three or more spectral regions can be selected and correspondingly detected. The versatility of the device can be considerably increased in this manner.

A modular combination of the selection units and of the detection units, namely, their combination into a quasi monolithic module can be implemented at a suitable place in or on the instrument. Due to the monolithic design, there is no need to do any adjustment work on the selection units on and the detection units since a fixed association of the individual optical modules with respect to each other is prescribed there.

For purposes of detecting fluorescence, a photomultiplier, for example, is provided as the detector. If quick measurements are needed, then the module should comprise an arrangement of photodiodes as the detector. Particularly in the case of weak signals, an arrangement of APDs (Avalanche Photo-Diodes) is recommended as the detector. As a matter of principle, the cascades can be provided with any conceivable detectors that are suitable for every conceivable application for any detection requirement.

If APDs are provided, then it is advantageous to arrange these in the first cascade since—on the basis of the current state of the art—they are the most sensitive detectors in the entire arrangement and since the imaging properties fundamentally deteriorate towards the next cascades. Incidentally, the APDs have no detection surfaces. As already mentioned above, different types of detectors can also be used in different cascades.

Normally, the means for blocking and reflecting will be configured in such a way that only one cascade with its appertaining detectors is active at any given point in time. However, by the same token, it is also possible to activate different cascades at the same time—simultaneously—and for this purpose, the means for blocking and reflecting have to be appropriately configured. In an advantageous manner, these means for blocking and reflecting can spectrally split the light beam into predefinable ratios—preferably in a variable manner.

The entire spectrum could be divided into certain fractions such as, for example, 10% to 90% spectral fraction. Likewise, the division could be a division with a neutral splitter. In other words, this would mean that approximately 10% of all spectral fractions are deflected into a "FLIM cascade" (FLIM=Fluorescence Lifetime Imaging Microscopy) and 90% of the spectral fractions are deflected into an "imaging cascade". By the same token, a polarization-dependent division of the spectral region with a polarization splitter is also conceivable. Here, for example, all of the S-fractions of the spectrum could be deflected into a certain detection cascade and all P-fractions could be deflected into another detection cascade. The mirror slides that can be used for this would have to be suitably configured and arranged.

The selection unit for blocking and reflecting the spectral regions could comprise mirror slides that can be opened entirely or only partially. If—as already mentioned above by way of an example—only one detector cascade is used, then the mirror slides could be completely open in the first detection branch, namely, when the second cascade is going to be used. If various cascades are used simultaneously, the mirror slides would be partially open, namely, depending on the desired division.

An advantageous aspect of using mirror slides lies in the fact that one can switch back and forth between the individual cascades by merely shifting one or more of the mirror slides. This is especially significant when a confocal overview image is to be taken quickly in order to subsequently carry out FCS or lifetime measurements at a certain place in a specimen for which detectors other than photomultipliers are being used.

As far as the design is concerned, the cascades with their individual selection unit and detection unit could be arranged flat together. A three-dimensional arrangement is likewise conceivable in which the possibility exists to design the three-dimensional module as compact as possible. It is also possible to expand individual detection branches or cascades via appropriate connections so that, for example, a larger number of photomultipliers can be used later on. In any case, it is also fundamentally possible to expand the module—modularly—with additional detection capabilities, whereby the expansion can be effectuated not only by adding more cascades but also by inserting detection branches into the individual cascades.

Optical means for adapting the individual images are provided between the cascades and the detection branches. These optical means serve, for instance, to image spectrally split focus lines into the next cascade. In concrete terms, the optical means comprise lenses or lens arrangements. Directly in front of a detector, for example, in front of the APDs, optical means can be provided to reverse the spectral splitting, especially since the APDs have a very small detection surface. In this context, prisms or the like can be used as optical means.

Moreover, it is advantageous if shutters are arranged in the beam path in front of the detectors—regardless of their design—whereby said shutters only open as needed, i.e. for detection purposes. In this context, the shutters could be configured in such a way that they close automatically when too much light strikes the detectors during the detection. This measure protects the detectors since then, in any case, they are not exposed to light when they are not being used for detection and when too much light would strike the detectors.

Regarding the detectors themselves, it is advantageous if they can be cooled. Cooling is advantageous with any type of detectors and can even be necessary for detectors having special designs.

Due to the different types of detectors, it is also advantageous if electronics adapted to the specific type of detector are connected downstream from the detectors. Thus, for example, rapid photodiodes require a 50 Ω connection. By the same token, the cabling also plays an important role so that it is once again advantageous to adapt the cabling of the individual detectors in terms of the cable length, resistance, impedance and the like, to the specific type of detector.

Moreover, it should be noted that very different application possibilities exist for the device according to the invention. An advantageous use is in a scanning microscope, which can preferably be a confocal laser scanning microscope.

BRIEF DESCRIPTION OF THE DRAWING

Various possibilities exist to configure and refine the teaching of the present invention in an advantageous manner. For this purpose, reference is made to the explanation below of embodiments of the teaching according to the invention on the basis of the drawings. Generally preferred embodiments and refinements of the teaching are also explained in conjunction with the explanation of the preferred embodiments of the invention on the basis of the drawings. The drawings show the following.

DETAILED DESCRIPTION

Figure 1:
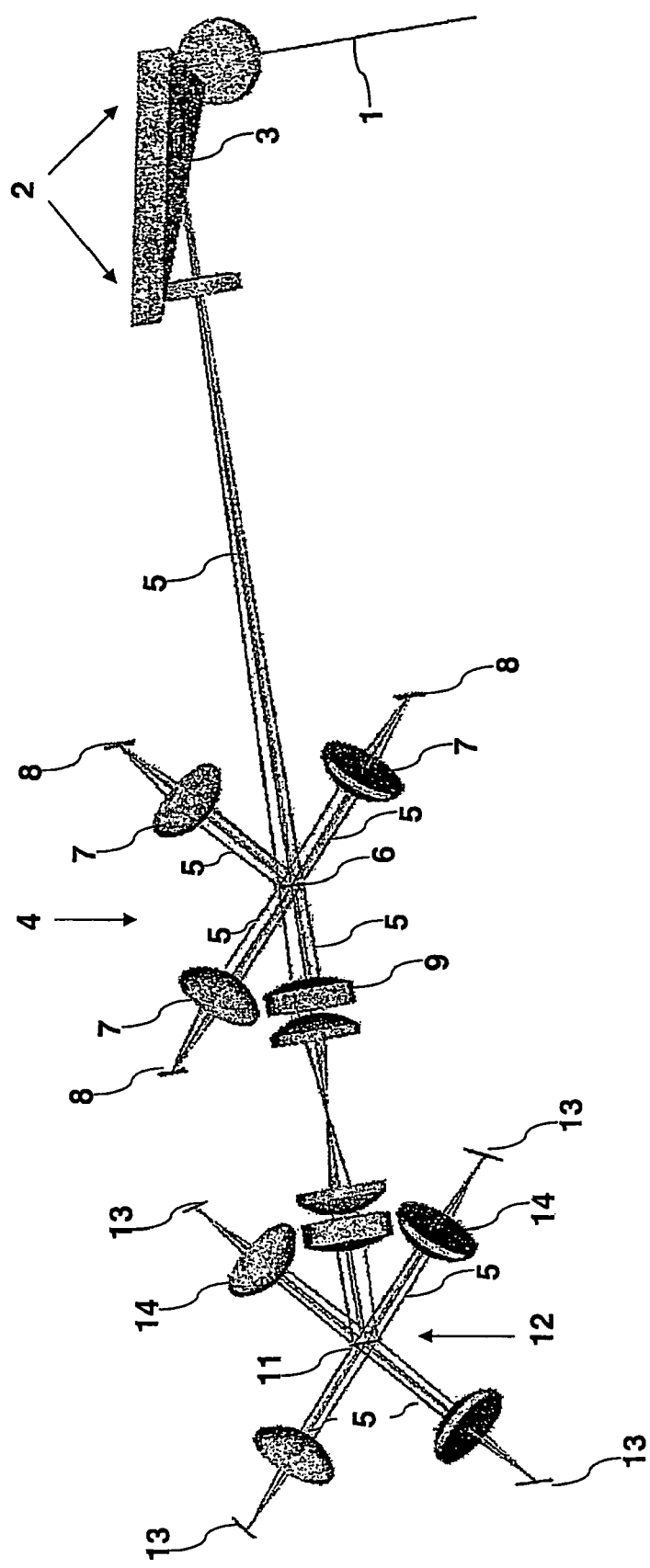
FIG. 1 a schematic depiction of a device according to the invention, with cascading detection branches.

FIG. 1 is a schematic diagram showing the basic structure of a device according to the invention. The light beam 1 that is to be spectrally split and then reflected comprises a merely schematically indicated selection unit 2 which, in turn, has means 3 for spectrally splitting the light beam 1. In the first cascade 4, the spectrally split light 5 strikes a set of mirror slides 6, hereinafter referred to as mirror slide 6 for the sake of simplicity. From the mirror slide 6, via the optical means 7, the light 5 can reach a total of three detectors 8 of the first cascade 4, depending on the position of the mirror slide 6.

Light that is not blocked at the mirror slide 6 passes through additional optical means 9, 10 to reach a second set of mirror slides 11 of the second cascade 12. This set of mirror slides 11 will also hereinafter be referred to simply as mirror slide 11 for the sake of simplicity. From the mirror slide 11, the light 5 is blocked or deflected to a total of four detectors 13 of the second cascade 12. Once again, optical means 14 are provided that serve to adapt the specific image, especially in order to reverse the spectral splitting before the individual detectors 13.

Figure 2:
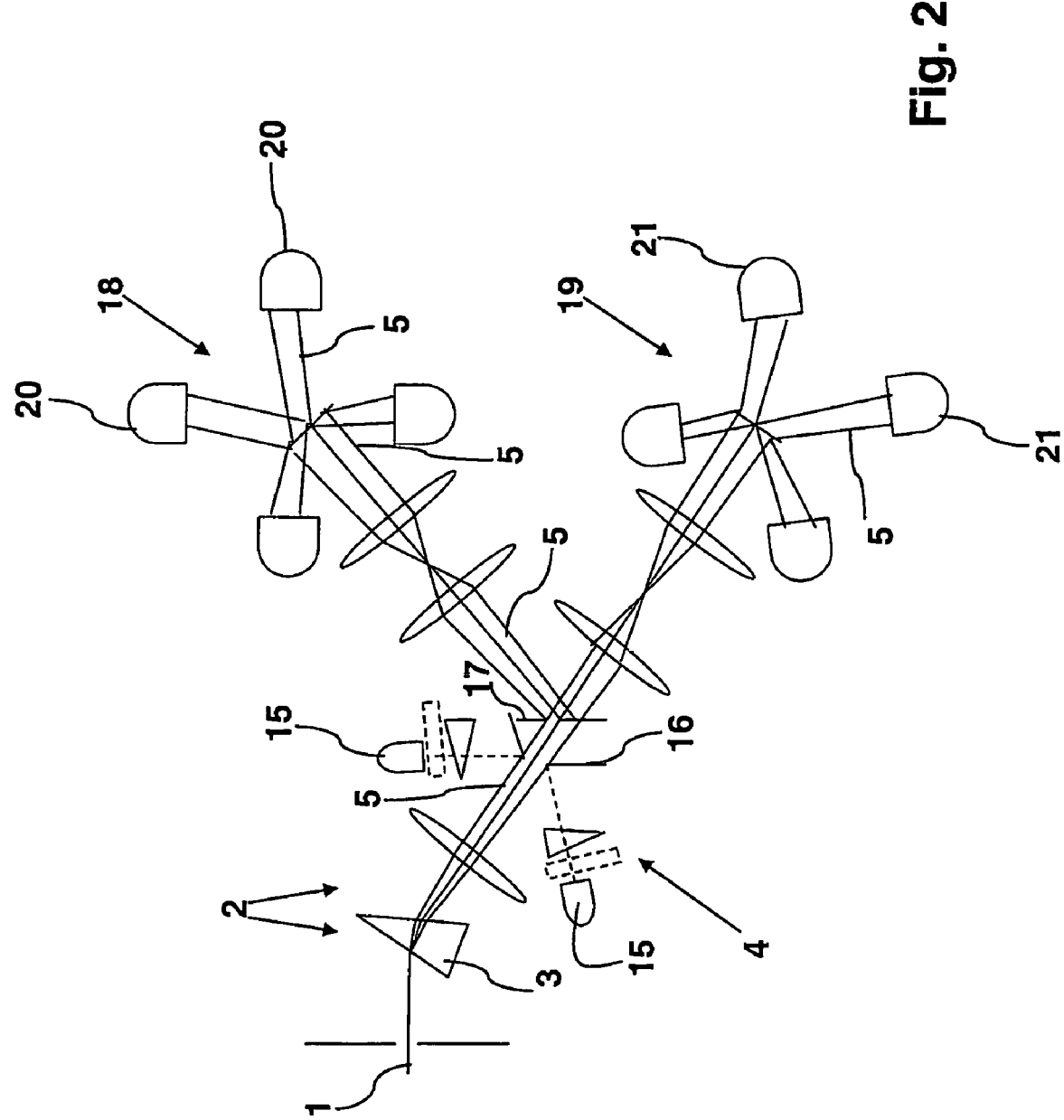
FIG. 2 a schematic depiction of a second embodiment of a device according to the invention in which the detectors of the first cascade are configured as APDs.

According to the schematic depiction in FIG. 2, special detectors, namely, APDs 15, are arranged in a first cascade 4. Merely by way of example, two of these APDs 15 are shown which receive blocked light via a set of mirror slides 16. Via another set of mirror slides 17, the spectrally split light 5 reaches two cascades 18, 19, whereby the cascade 18 comprises PMTs 20 and the cascade 19 comprises photodiodes 21 as the detectors, namely, similar to the arrangement from FIG. 1.

The schematically depicted embodiments explained above serve merely for purposes of a better understanding of the claimed teaching, but are not to be construed as a limitation of the teaching to the embodiments.

The invention claimed is:

1. An apparatus for the spectral selection and detection of spectral regions of a light beam, the apparatus comprising:
   a first selection unit including a first spectral splitting device configured to spectrally split the light beam; and
   a first device configured to deflect a portion of the spectrally split light beam so as to provide a deflected first spectral region in first and second beam paths and an undeflected second spectral region; and
   a first detection unit including a plurality of first detectors, at least a first one of the first detectors being disposed in the first beam path of the spectral region, at least a second one of the first detectors being disposed in the second beam path of the first spectral region, each of the first and second first detectors having a respective different detection property or using a respective different detection method, and each of the first and second first detectors including at least one of:
      a photomultiplier configured to detect fluorescence,
      an arrangement of photodiodes configured for making quick measurements,
      and an arrangement of avalanche photodiodes configured for detecting weak signals.

2. The apparatus as recited in claim 1 further comprising:
a second deflecting device configured to deflect a third spectral region of the first spectral region or the second spectral region;
a second detection unit including a plurality of second detectors, at least one of the second detectors being disposed in a third beam path of the third spectral region, at least one of the second detectors being disposed in a fourth beam path of the second spectral region, each of the second detectors having a respective different detection property or using a respective different detection method.

3. The apparatus as recited in claim 2 wherein the second deflecting device and the second detection unit are disposed in a cascaded arrangement with the first deflecting device and the first detection unit.

4. The apparatus as recited in claim 1 wherein the plurality of first detectors includes at least three detectors, and the first light deflecting device is configured to at least one of block or reflect at least a respective spectral region to each of the at least three detectors.

5. The apparatus as recited in claim 1 wherein the first deflecting device is configured to divide an entire spectrum into a plurality of predefinable fractions.

6. The apparatus as recited in claim 1 wherein the first deflecting device is configured to provide a neutral spectral division.

7. The apparatus as recited in claim 1 wherein the first deflecting device is configured to provide a polarization-dependent division.

8. The apparatus as recited in claim 1 wherein the first deflecting device and the plurality of first detectors are disposed in a common module.

9. The apparatus as recited in claim 2 wherein the first deflecting device and the second deflecting device are configured so that only one of the first and second deflecting devices is active at a time.

10. The apparatus as recited in claim 2 wherein the first deflecting device and the second deflecting device are configured so that both of the first and second deflecting devices are simultaneously active.

11. The apparatus as recited in claim 1 wherein the first deflecting device is configured to spectrally split the light beam into a predefinable ratio.

12. The apparatus as recited in claim 1 wherein the first deflecting device includes a mirror slide openable at least partially.

13. The apparatus as recited in claim 1 wherein the first deflecting device is disposed in a flat arrangement.

14. The apparatus as recited in claim 1 wherein the first deflecting device is disposed in a three-dimensional arrangement.

15. The apparatus as recited in claim 2 further comprising an optical device configured to adapt an image and disposed between the first deflecting device and the second deflecting device.

16. The apparatus as recited in claim 15 the optical device is configured to image split focus lines into the second deflecting device.

17. The apparatus as recited in claim 15 the optical device includes a lens.

18. The apparatus as recited in claim 1 further comprising an optical device disposed in front of at least one of the first detectors and configured to reverse the spectral splitting.

19. The apparatus as recited in claim 18 wherein the optical device includes a prism.

20. The apparatus as recited in claim 1 further comprising a shutter disposed in the first or second beam path in front of at least one of the first detectors configured to open for a detection.

21. The apparatus as recited in claim 20 wherein the shutter is configured to close automatically as a function of an amount of light striking the at least one of the first detectors during the detection.

22. The apparatus as recited in claim 1 wherein the first detectors are configured to be cooled.

23. The apparatus as recited in claim 1 further comprising electronics adapted to a type of the first detectors and connected downstream from the first detectors.

24. The apparatus as recited in claim 1 wherein a cabling of at least one of the first detectors is adapted in terms of at least one of a cable length, a resistance, and an impedance to a type of at least one of the first detectors.

25. The apparatus as recited in claim 1 further comprising:
a second deflecting device configured to deflect the second spectral region, and to deflect a third spectral region not deflected by the first device; and
a second detection unit including a plurality of second detectors, at least one of the second detectors being disposed in a third beam path of the second spectral region, at least one of the second detectors being disposed in a fourth beam path of the third spectral region, each of the second detectors having a respective different detection property or using a respective different detection method.

26. A scanning microscope comprising an apparatus for the spectral selection and detection of spectral regions of a light beam, the apparatus comprising:
a first selection unit including: a first spectral splitting device configured to spectrally split the light beam; and
a first deflecting device configured to deflect a portion of the spectrally split light beam so as to provide a deflected first spectral region in first and second beam paths and an undeflected second spectral region; and
a first detection unit including a plurality of first detectors, at least one of the first detectors being disposed in the first beam path of the first spectral region, at least one of the first detectors being disposed in the second beam path of the reflected first spectral region, each of the first detectors having a respective different detection property or using a respective different detection method.

* * * * *